United States Patent [19]
Richmond

[11] 3,925,713
[45] Dec. 9, 1975

[54] AUTOMATICALLY GUIDING WORKPIECES THROUGH A MACHINE

[75] Inventor: Richard Malcolm Richmond, Rushden, England

[73] Assignee: The Shoe & Allied Trades Research Association, Northamptonshire, England

[22] Filed: Nov. 7, 1973

[21] Appl. No.: 413,426

[30] Foreign Application Priority Data
Nov. 9, 1972  United Kingdom............. 51880/72

[52] U.S. Cl. .................. 318/575; 318/8; 318/51;
318/575; 121/121.11
[51] Int. Cl. ......................................... G05b 19/32
[58] Field of Search ......... 318/571, 578, 575, 8, 52,
318/51; 112/121.11, 121.12

[56] References Cited
UNITED STATES PATENTS

| | | | |
|---|---|---|---|
| 3,170,423 | 2/1965 | Henebry ........................ | 318/578 X |
| 3,454,853 | 7/1969 | Hawkins et al. .................... | 318/578 |
| 3,474,747 | 10/1969 | Noiles ............................ | 112/121.12 |
| 3,559,021 | 1/1971 | Bingham, Jr. ................. | 112/121.12 X |
| 3,742,879 | 7/1973 | Schaefer, Jr. ................... | 318/571 X |
| 3,750,186 | 7/1973 | Sakamoto ...................... | 112/121.12 |

*Primary Examiner*—B. Dobeck
*Attorney, Agent, or Firm*—Lerner, David, Littenberg & Samuel

[57] ABSTRACT

Automatic guiding apparatus has first and second drive wheels which are driven from a common source for effecting feeding of a workpiece in a straight line through a machine. For effecting steering of the workpiece along a line parallel to the edge, a sensor senses the edge, a computer calculates the speed differential required to be imparted to the two drive wheels for steering about the centre of curvature of the edge, and an adding device superimposes additional positive or negative speed on one of the drive wheels. The adding device can be mechanical, such as a differential gearbox, where the wheels are driven from a common motor, or a frequency shifter where the wheels are driven by separate stepper motors supplied with pulses from a common oscillator. Automatic speed control is incorporated for negotiating sharp corners. The drive wheels are parallel to each other. In an alternative embodiment, a pair of drive wheels feed the material through the machine with one edge in engagement with a stop and an auxiliary wheel, controlled by a servo and edge sensor, is driven in opposite directions transverse to the direction of feed for effecting steering.

30 Claims, 10 Drawing Figures

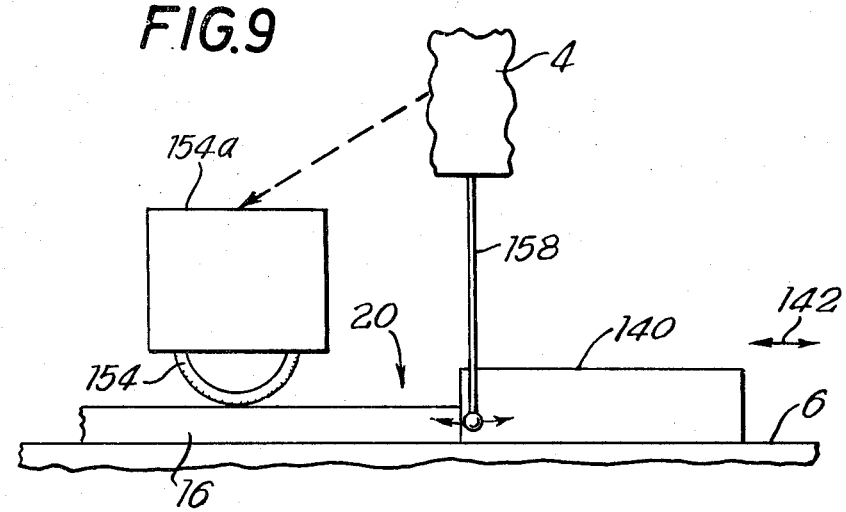
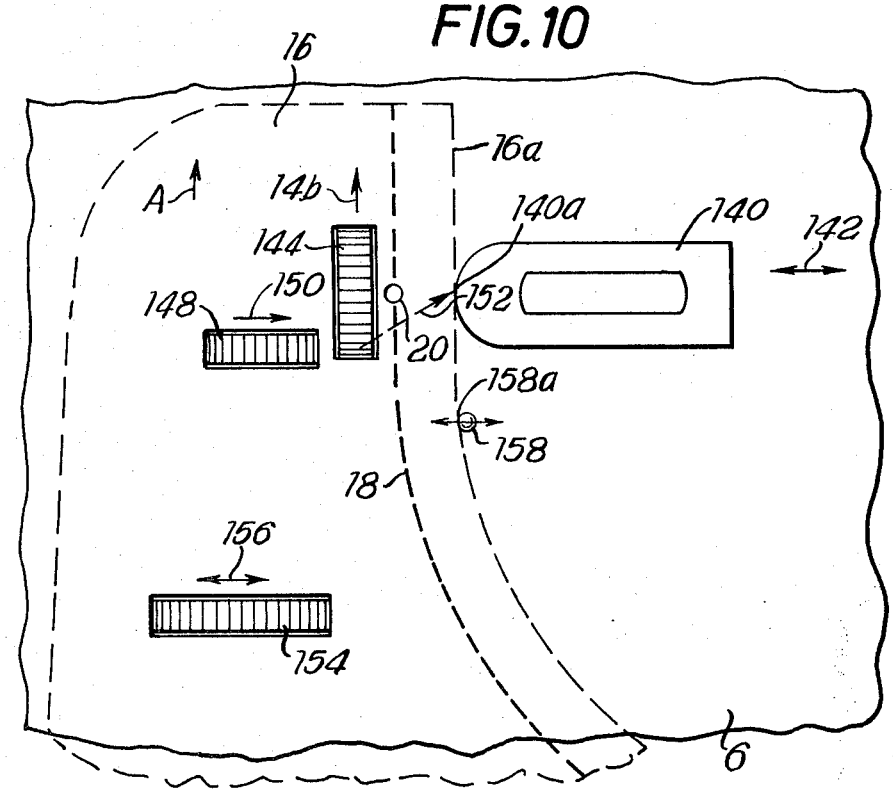

AUTOMATICALLY GUIDING WORKPIECES THROUGH A MACHINE

FIELD OF THE INVENTION

This invention relates to automatically guiding workpieces through a machine.

The invention is particularly applicable to the closing of shoe uppers, and thus it will be particularly described in connection with sewing machines for carrying out closing operations in the closing room of the shoe factory. However, it is to be understood that the invention may have other applications.

BACKGROUND

Various systems for automatically guiding a workpiece through a machine have been proposed in the prior art. For example, U.K. Patent Specification No. 1,063,001 describes a sewing machine in which the axis of a guide wheel is turned with the aid of a cam controlled linkage so as to cause the workpiece to move along a desired path through the machine. This arrangement requires a special cam to be constructed every time the path of the workpiece has to be changed, and there is no means to ensure accurate steering of the workpiece along the required path.

U.K. Patent Specification No. 1,205,290 discloses a sewing machine in which a combined guide/feed wheel is controlled, for the purpose of steering the workpiece, by a servo mechanism which includes a sensor sensing the edge of the workpiece with a view to providing a stitch line which remains at a uniform distance from the edge. However, since the combined feed/guide wheel is turned to provide guidance, the actual direction of feeding of the workpiece through the machine will be varied. Highly accurate guidance is not ensured and there is no means to ensure that the actual stitches formed remain parallel to the edge of the workpiece.

U.K. Patent Specification No. 962,160 discloses a machine for performing a folding operation on the edge of a workpiece, the machine including an automatic guidance mechanism. In the machine, the workpiece is advanced intermittently. Each advance of the workpiece is in a straight line. In the intervening periods, steering of the workpiece is effected. The steering mechanism comprises an edge sensor and a pair of spaced apart wheels having their axes perpendicular to the direction of advance but driven, in the aforesaid intervening periods and when commanded by the edge sensor, with different peripheral speeds which are in a fixed ratio to one another. Thus, the point about which the workpiece is turned is fixed, and is irrespective of the radius of curvature of the line which the workpiece is to follow; and furthermore the actual advance of the workpiece is always in a straight line.

U.K. Patent Specification No. 1,002,283 discloses a sewing machine in which the workpiece is advanced intermittently. The advance is always along a straight line. However, steering means is provided for effecting a steering action on the workpiece by causing the workpiece to rotate about the needle when the needle is inserted into the workpiece. This means is controlled by a servo mechanism including a photoelectric device for sensing the edge of the material. However, as indicated, the centre of turning is always the needle, and this is regardless of the radius of curvature. Also, since the advance of the material is always in a straight line, the actual stitches will not always be parallel to the edge.

U.K. Patent Specification No. 1,002,281 discloses a system similar to that in U.K. Patent Specification No. 1,002,283 except that the machine is a cementing and folding machine and in this case the centre of rotation is provided by a special gripper which engages the material at a fixed point in the periods between advance of the workpiece.

U.K. Patent Specification No. 989,874 discloses a skiving machine in which the workpiece is continuously advanced toward the skiving knife. An edge sensor and servo mechanism is provided for effecting steering of the workpiece with a view to causing the skiving to be carried out correctly along the edge. Rotation of the workpiece during steering takes place about arbitrary centres and the machine is only operable at a constant speed.

Accordingly, there exists a need for a guidance mechanism in which highly accurate guidance can be achieved and, if desired, variations in the rate of feeding the workpiece through the machine can be accommodated by the guidance apparatus, without loss of accuracy of the guiding operation.

THE INVENTION

In one aspect, the invention provides apparatus for automatically guiding a workpiece through a machine comprising sensing means for sensing a line or edge or the like of a workpiece and means responsive to the sensing means for causing the workpiece to execute predetermined movements whereby operations on the workpiece are carried out at predetermined positions.

In a further aspect, the present invention provides a machine, preferably a machine for use in shoe making for example a sewing machine, for carrying out operations on shoe upper material, provided with automatic guidance means for guiding the shoe upper material through the machine, said guidance means including means for causing the material to rotate in response to predetermined signals whereby the operations are caused to be carried out along a predetermined line. The signals may be derived from a memory unit or may be derived from a sensor arranged for example to sense the edge of the material.

THE DRAWINGS

The invention is described further by way of example with reference to the accompanying drawings in which:

FIG. 9 is a diagrammatic side view of a guidance apparatus according to a further embodiment of the invention; and FIG. 10 is a diagrammatic plan view of the apparatus of FIG. 9.

Figure 1:
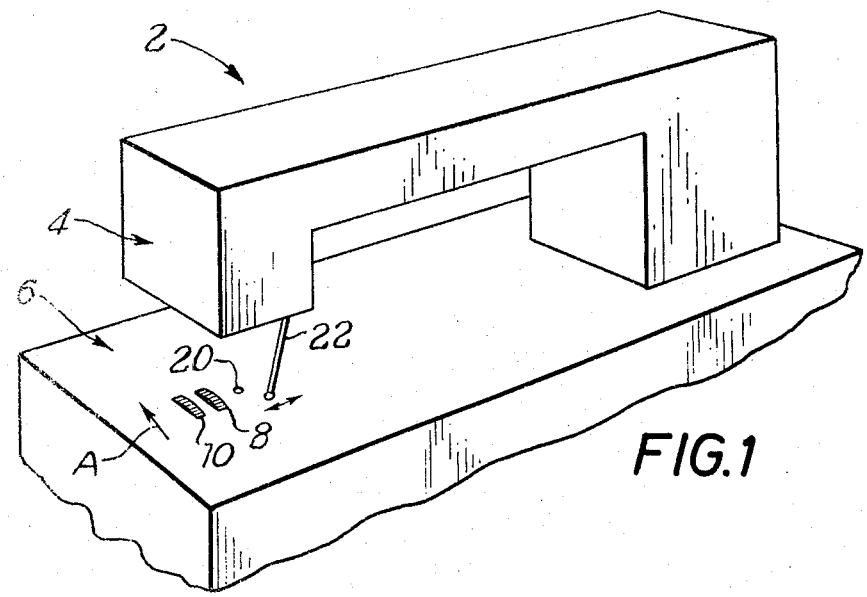
FIG. 1 is a diagrammatic perspective view of a sewing machine incorporating automatic guidance apparatus according to an embodiment of the invention.
Figure 2:
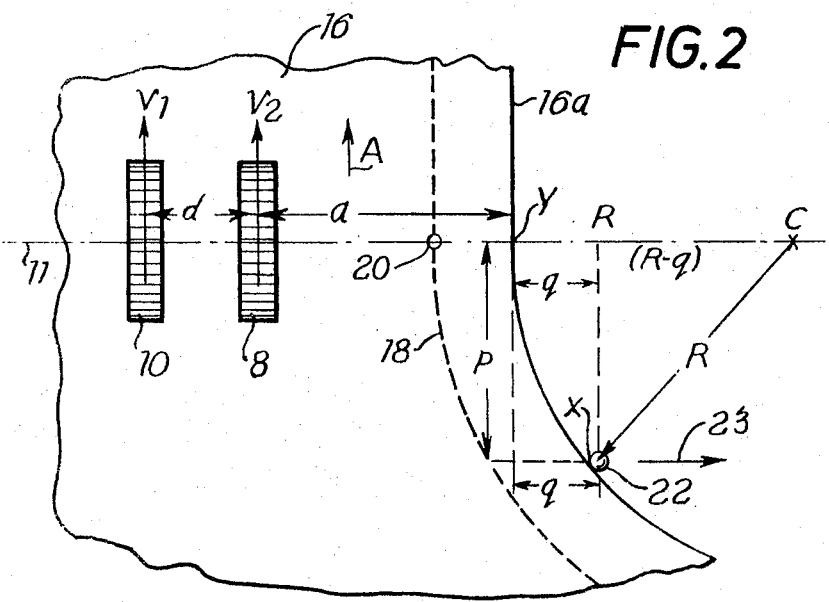
FIG. 2 is a diagram for assisting in understanding the theory of operation of the guidance apparatus of FIG. 1.
Figure 3:
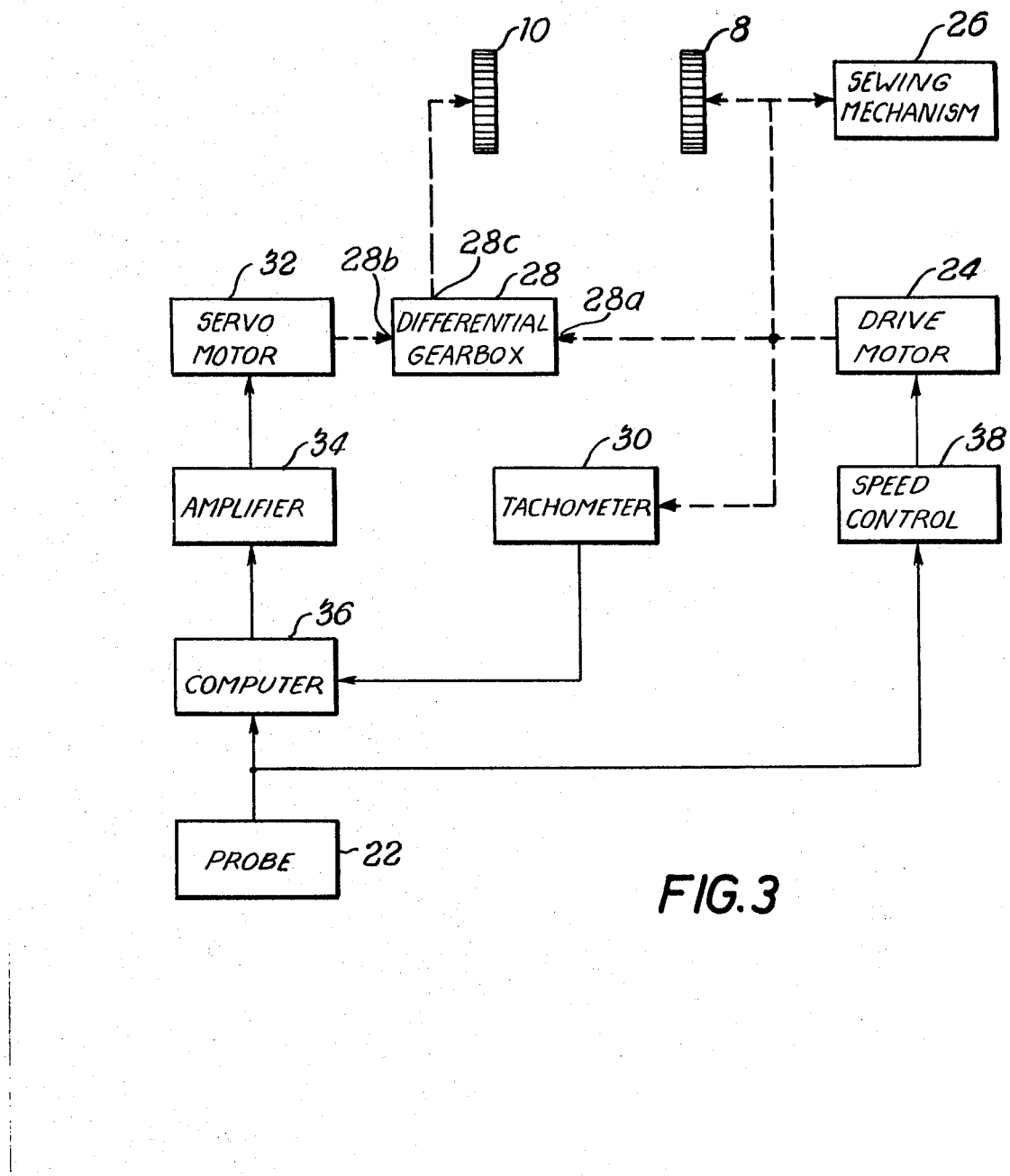
FIG. 3 is a block diagram illustrating the guidance and work feeding means of the sewing machine of FIG. 1.

Referring to FIGS. 1 to 3, a sewing machine 2 includes various conventional mechanisms which will not be described in detail, such as a sewing head 4 carrying the usual instrumentalities including the needle, which instrumentalities are not shown, and a flat bed 6. In addition, however, the machine 2 includes an automatic guidance apparatus to be described in detail.

The sewing machine 2 is intended for carrying out stitching operations on material such as leather, particularly for the purpose of making shoes. The automatic guidance apparatus is set up to cause a stitch line to be formed parallel to the curved edge of a piece of leather, such as the quarter of a shoe upper, and thus the apparatus feeds and guides the piece of leather through the machine in such a way that the leather is rotated as appropriate to maintain the stitch line parallel to the edge. For this purpose, the automatic guidance apparatus includes a pair of coaxial drive wheels 8, 10 whose axis is perpendicular to the direction of feed past the needle. If the wheel 10 is driven faster than the wheel 8 the leather, indicated by reference number 16 in FIG. 2, will be swung clockwise whereas if the wheel 10 is driven more slowly than the wheel 8 the leather 16 will swing anticlockwise. If the two wheels 8 and 10 are driven at the same speed there will be no rotation of the leather 16.

The edge of the piece of leather 16 which the stitch line is to be parallel to is indicated by the reference number 16a in FIG. 2 and the stitch line by the reference number 18. The position of the sewing machine needle is indicated by the reference number 20, and is such that the needle axis intercepts the axis 11 of the wheels 8, 10. A probe 22 is provided to sense the edge 16a of the leather 16 and to produce an output signal, such as a voltage, indicative of the position of the probe. If it is assumed that the edge 16a is arcuate between the position X at which the probe 22 contacts the edge 16a and that position Y on the edge 16a which is in the same vertical plane as the wheel axis 11, in order that the stitch line 18 will remain parallel to the edge 16a, the following relation should be satisfied:

$$\frac{v_1}{d+a+R} = \frac{v_2}{a+R} \qquad \text{Equation I}$$

where:
$v_1$ is the circumferential velocity of the drive wheel 10;
$v_2$ is the circumferential velocity of the drive wheel 8;
$d$ is the spacing between the drive wheels 8 and 10 (from the centre plane to centre plane);
$a$ is the distance between the drive wheel 8 and the edge 16a (as measured from the centre plane of the drive wheel 8);
$R$ is the radius of the arc X Y.

The speed $v_1$ at which the drive wheel 10 is driven is therefore variable, and in order to calculate the speed at which it should be driven relative to the speed $v_2$ at which the wheel 8 is driven, equation I can be rearranged as follows:

$$v_1 = v_2 \left(1 + \frac{d}{a+R}\right) \qquad \text{Equation II}$$

If it is assumed that the distance $a$ is known for example by providing a stop which the edge of the material 16a can be placed against or by providing a mark on the bed of the machine to indicate to the operator where the edge should be placed, the only unknown in the equation II is R.

However:
$$R^2 = (R - q)^2 + p^2 \qquad \text{Eq. III}$$

where $p$ is the distance between the probe 22 and the axis 11 of the drive wheels 10 and 8 and $q$ is the distance between the point Y and a line through the probe 22 at right angles to the axes of the drive wheels 8 and 10 (i.e., $q$ is the distance of the probe from the position it would be in if the edge 16a were straight).

Rearranging equation III, gives:

$$R = \frac{p^2 + q^2}{2q} \qquad \text{Equation IV}$$

By substitution of equation IV into equation II, $$v_1 = v_2 + \frac{2dq\, v_2}{p^2 + 2aq + q^2} \qquad \text{Equation V}$$

The drive system for the sewing machine, which causes the wheels 8 and 10 to be driven in accordance with the peripheral velocity relationship defined by equation V is illustrated in FIG. 3. FIG. 3 is a block diagram indicating both electrical and mechanical components. Mechanical connections are indicated by broken lines and electrical connections by continuous lines. A main drive motor 24 drives both the wheel 8, the sewing mechanism 26 (including the needle, etc.), one input 28a of a differential gearbox 28 and a tachometer 30. A second input 28b of the gearbox 28 is driven by a servo motor 32. The servo motor 32 is reversible. The output, indicated by reference number 28c, of the differential gearbox 28 drives the wheel 10. The arrangement is such that when the servo motor 32 is stationary, the wheel 10 is driven at the same speed as the wheel 8. This is the condition which arises when the edge of the workpiece is straight, i.e., the probe 22 is at its null position representative of the quantity $q$ being zero. It can be seen that when $q$ equals zero, the right hand term of equation V becomes zero so that $v_1$ equals $v_2$.

The servo motor 32 is powered by the output of an amplifier 34 which in turn receives the output signal from a computer 36. The computer 36 is constructed to compute the right hand term of equation V. The only variables in this equation are $v_2$ and $q$. Accordingly, the probe 22 is connected to an input of the computer 36 to supply thereto a signal representative of $q$, and a further input of the computer 36 receives a signal from the tachometer 30 representative of the speed of the motor 24 which in turn is representative of $v_2$.

When $q$ is zero, the output of the computer 36 is zero and thus the servo motor 32 will be stationary under these conditions. The value of $q$ can be positive or negative according to whether the curvature of the edge of the workpiece is concave or convex and thus the output of the computer 36 can be positive or negative. When the output of the computer 36 is positive, the servo motor is rotated in one direction at a speed proportional to the magnitude of the signal produced by the computer 36. This rotation of the servo motor 32 is, by means of the differential gearbox 28, added to the rotation imparted to the wheel 10 by the drive motor 24 so that $v_1$ is related to $v_2$ by equation V. When $q$ is negative, the servo motor 32 will rotate in the opposite direction again at a speed proportional to the magnitude of the right hand term of equation V and thus the rotation of the servo motor 32 is subtracted from the rotation imparted to the wheel 10 by the drive motor 24 In other words, $v_1$ can be greater or less than $v_2$ and the differential between the two speeds is in accordance with equation V. The system thus superimposes on the speed imparted to the wheel 10 by the motor 24 a positive or negative speed which is dependent upon the radius of curvature of the edge to be followed. The superimposed positive or negative speed is calculated precisely (subject to practical limitations as to accuracy) so that the centre of rotation of the workpiece is coincident with the centre of curvature of the edge and thus with the centre of curvature of the required line of stitching.

It has been assumed so far that the motor 24 has been operating at a constant speed. However, when sharp corners are to be negotiated it is desirable that the speed should be reduced. In order to achieve this automatically, a speed control 38 is provided. This receives the output of the probe 22 and may be arranged either to provide continuously varying speeds to the drive motor 24 (maximum speed being when $q$ equals zero) or to provide one or more discrete changes of speed when the magnitude of $q$ reaches or exceeds one or more respective threshold levels. Since the sewing mechanism 26 is also driven by the motor 24, the sewing mechanism is automatically slowed down and speeded up with the speed of feeding.

Figure 4:
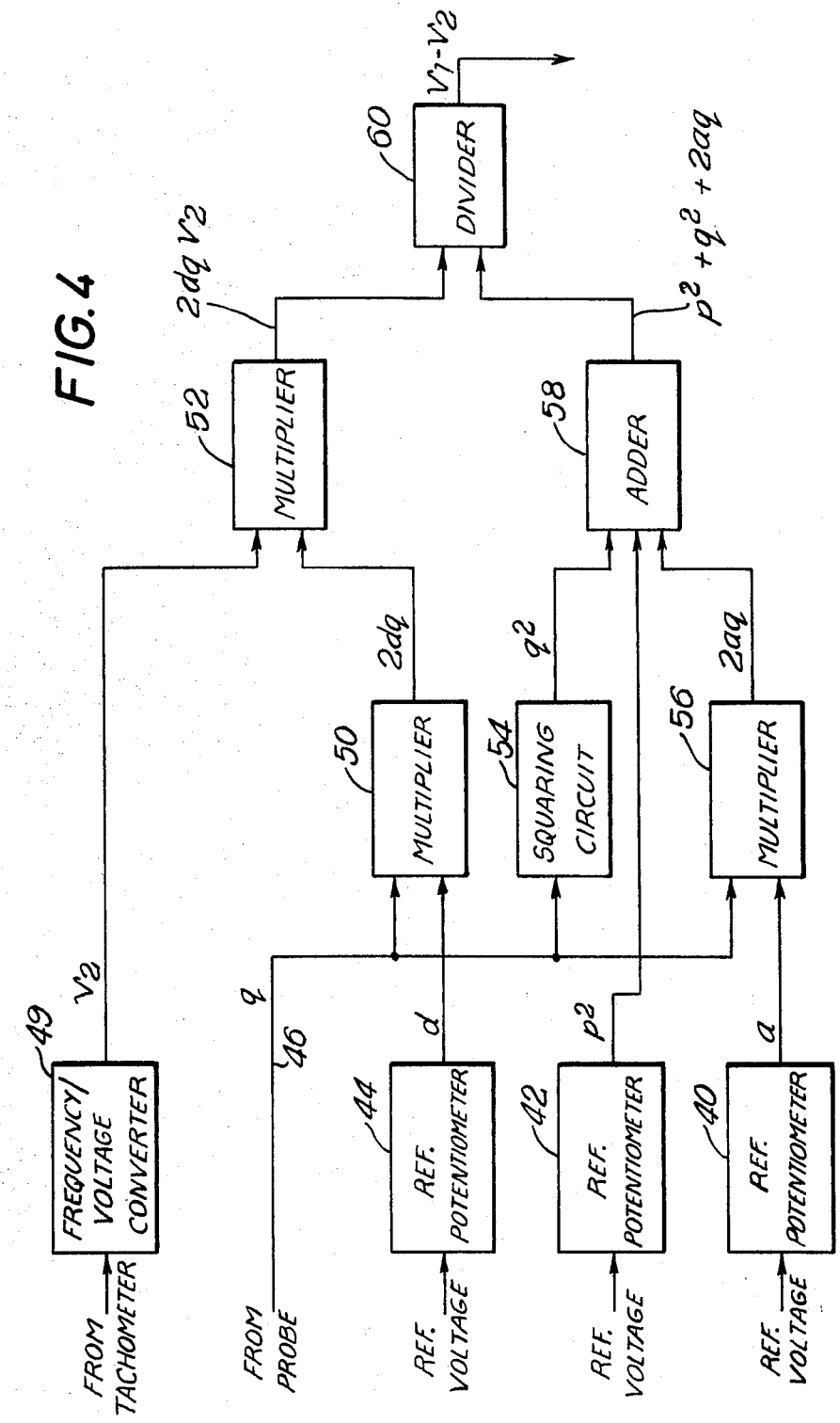
FIG. 4 is a block diagram of an analogue computer included in the apparatus shown in FIG. 3.

Referring to FIG. 4, the computer 36 is illustrated as an analogue computer comprising three reference potentiometers 40, 42, 44 all connected to a reference voltage source and set up respectively to produce voltages representative of the values $a$, $p^2$ and $d$. The signal from the probe, which may for example comprise a differential transformer arranged to give zero output voltage when the core is in a null position indicative of the edge of the material being guided being straight and to produce, with the aid of appropriate rectifying circuitry, positive or negative voltages upon displacement of the probe in either direction, is applied to an input line 46, which signal therefore is representative of $q$. The signal from the tachometer, in the form of a pulse train having a frequency representative of motor speed, is applied to a frequency to voltage convertor 48 which thus produces a voltage representative of $v_2$.

A multiplier 50 produces the product $2dq$ and a further multiplier 52 produces the product $2dq\,v_2$. A squaring circuit 54 produces the term $q^2$, and the term $2aq$ is produced by a multiplier 56. An adder 58 produces a voltage proportional to the expression $p^2 + q^2 + 2aq$, and a divider divides the output of the multiplier 52 by the output of the adder 58 thus to produce the expression:

$$\frac{2dq\,v_2}{p^2 + 2aq + q^2}$$

As is apparent from equation V, the above expression is in fact equal to $v_1 - v_2$, that is to say the required peripheral speed differential between the wheels 8 and 10 to produce steering of the workpiece about the centre of curvature of the edge.

Figure 5:
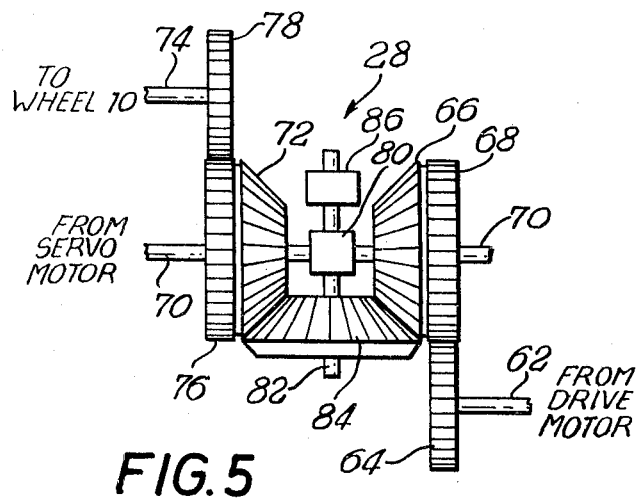
FIG. 5 is a drawing of transmission gearing included in the guidance means of FIGS. 1 to 3.

The arrangement of the differential gearbox 28 shown in FIG. 3, is illustrated in more detail in FIG. 5. The gearbox 28 comprises an input shaft 62 which is driven by the motor 24 through a transmission which is not illustrated, and an input gear 64 fixed to the shaft 62 and driving a first bevel gear 66 by way of an intermediate gear 68 which is fixed to the bevel gear 66. The gears 66 and 68 are rotatably mounted on a shaft 70 which in turn is rotatably supported in a support frame (not shown). The shaft 70 also rotatably supports a second bevel gear 72 which drives an output shaft 74 by way of a gear 76 fixed to the gear 72 and an output gear 78 which is fixed to the shaft 74 and is in mesh with the gear 76. A boss 80 is secured to the shaft 70 in between the two gears 66 and 72 and has a transverse shaft 82 fixed to it. An orbital gear 84 is rotatably carried on the shaft 82 at one end and is in mesh with the two bevel gears 66 and 72. A counter weight 86 is mounted on the shaft 82 at the opposite end to the gear 84 to avoid unbalanced masses when the shaft 70 is rotated, carrying with it the gear 84. The shaft 70 constitutes a second input to the gearbox and is connected, by a suitable transmission (not shown), to the output of the servo motor 32.

When the servo motor 32 is stationary, indicating that $v_1$ and $v_2$ are of equal value ($v_1 - v_2 = 0$) the output shaft 74 is driven at the same speed as the input shaft 62 so that the drive wheel 10, which is connected to the output shaft 74, is driven by the motor 24 at the same speed as the drive wheel 8. When the analogue computer 36 indicates that $v_1$ should not be equal to $v_2$, but should differ therefrom by a specified value as determined by equation V, the servo motor is driven at a speed representative of the required peripheral velocity differential of the wheels 10 and 8. Thus, the shaft 70 is rotated by the servo motor 32 in one direction or the other so that the gear 84 is caused to orbit in one direction or the other. Thus the required positive or negative velocity differential is added, by the differential gearbox 28, to the velocity imparted to the wheel 10 by the drive motor 24.

When the output from the computer 36 is zero indicating that the servo motor 32 should be stationary, the shaft 70 would preferably remain stationary to ensure driving of the wheel 10 at the correct speed. Thus, the shaft 70 may be provided, if necessary, with some means to provide sufficient resistance to rotation to prevent orbiting of the gear 84 under the action of the input torque from the motor 24. If such orbiting of the gear 84 could take place, the shaft 70 could be driven instead of or as well as the shaft 74 and thus the wheel 10 would not be correctly driven. On the other hand, as such incorrect driving would cause the workpiece to turn, it would be detected by the probe in this embodiment and automatically corrected by the servo-system.

It has been assumed so far that the motor 24 is driven continuously so that the workpiece is continuously fed through the machine, rather than intermittently fed. In order for the sewing needle to accommodate this, it is therefore necessary that a provision should be made for movement of the needle along the direction of feed while the needle is inserted into the workpiece. For this purpose, the needle may be pivoted about an axis transverse to the direction of feed and the needle mounting and driving arrangement would be such that when the needle is inserted into the material it is at its rearmost position so that it can be pivoted forwardly by the movement of the material while the needle is in the material.

Figure 6:
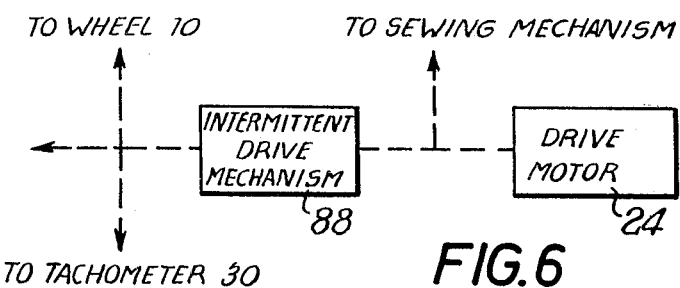
FIG. 6 illustrates a modification to the system shown in FIG. 3.

If it is desired to provide for intermittent movement of the workpiece through the machine, for example in order to permit simple vertical reciprocation of the sewing needle to be used, the sewing needle then entering the material during those periods when the material is stationary, the modification shown in FIG. 6 may be employed. In this modification, an intermittent drive mechanism 88 is interposed in the transmission between the drive motor 24 and the wheel 8, the gearbox 28 and the tachometer 30. The mechanism 88 is so arranged that torque appears at its output only during those intervals when the needle is out of the material. Since the tachometer is driven from the output of the intermittent transmission mechanism 88, the signal representing $v_2$ which is developed in the analogue computer is always zero during the intervals when the wheel 8 is stationary, and thus the servo motor 32 is always stationary during the same intervals.

FIG. 6 only shows those portions of the mechanical and electrical arrangement necessary for understanding the modification. The intermittent drive mechanism 88 can be of any conventional form, for example a mechanism including a rotating cam which transmits drive only during one portion of its rotation.

In the system so far described, the drive to both wheels 8 and 10 has been from the same motor 24, and the servo motor has provided a drive corresponding only to the required velocity differential between the two wheels 8 and 10. Also, in the embodiments so far described, the sewing mechanism has been driven from the motor 24.

Figure 7:
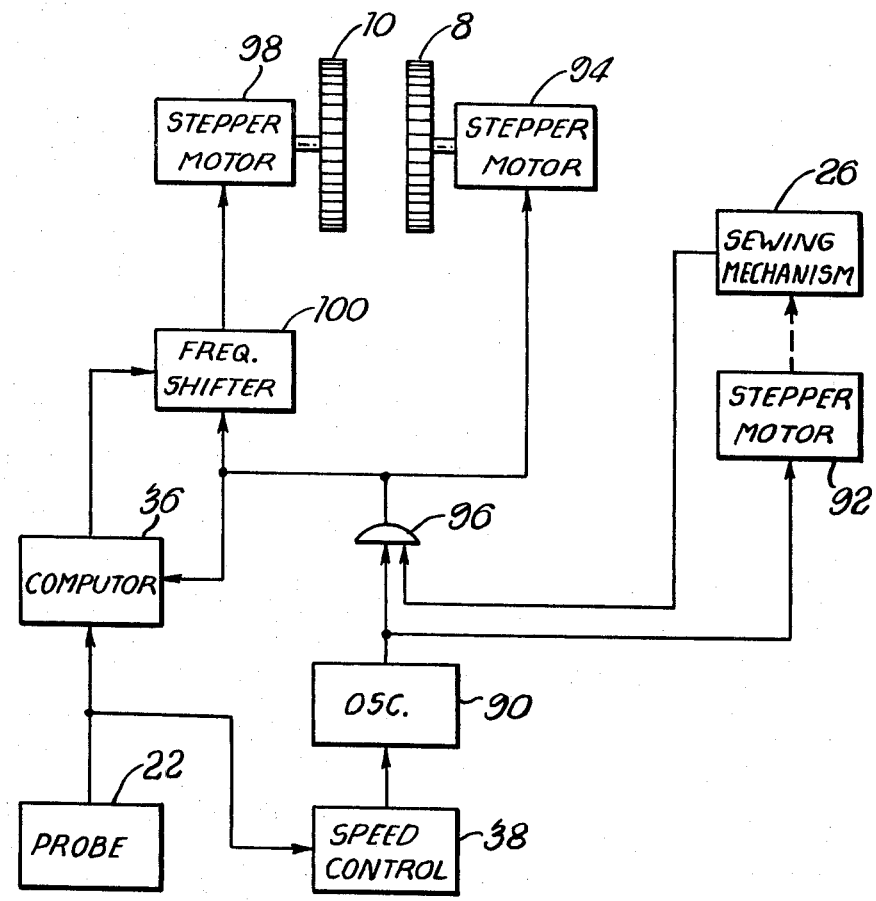
FIG. 7 is a block diagram showing another embodiment of the invention.

FIG. 7 illustrates an embodiment in which separate motors are used to drive the wheels 8, 10 and the sewing mechanism 26. The motors are illustrated as stepper motors and thus an oscillator 90 is provided for generating a continuous train of pulses. The output of the oscillator 90 is applied directly to a stepper motor 92 which drives the sewing mechanism 26. The wheel 8 is driven by a stepper motor 94 which receives the output of the oscillator 90 through a gate 96, and the wheel 10 is driven by a stepper motor 98 which receives pulses from the oscillator 90 through the gate 96 and through a frequency shifting circuit 100. The gate 96 is controlled by a signal derived from the sewing mechanism 26 such that the gate 96 is open only when the needle is out of the workpiece. Thus, when the needle is in the workpiece, the gate 96 is closed so that the stepper motors 94 and 98 are stationary. It will be appreciated that the closing of the gate 96 must be sufficiently in advance of the instant at which the needle enters the material to permit the wheels 8 and 10 to have come to rest.

The arrangement of FIG. 7 also includes the analogue computer 36 and probe 22 as previously described. In addition, a speed controller 38 which receives the signal $q$ is provided for varying the frequency of the oscillator 90 whereby to vary the speed of the three stepper motors. Thus, the speed at which the machine operates is varied according to the curvature of the edge of the material as previously described.

The computer 36 receives the pulse train from the output of the gate 96 and the frequency of these pulses are representative of $v_2$. Thus, the analogue circuit shown in FIG. 4 can be utilised in the arrangement of FIG. 7. When the output of the analogue computer 36 is zero, indicating that $v_1$ should equal $v_2$, zero frequency shift is introduced by the circuit 100. However, if the computer 36 produces a positive output signal, indicating that the wheel 10 should be driven faster than the wheel 8, the circuit 100 causes a train of pulses at higher frequency than that produced by the oscillator 90 to be supplied to the stepper motor 98. The period for which these pulses is applied is the same as the period during which the gate 96 is open. Accordingly, the wheel 10 is driven faster than the wheel 8 or, expressed in alternative terms, the angle through which the wheel 10 is rotated is greater than that through which the wheel 8 is rotated, the two rotations taking place during the same interval.

If, on the other hand, the output of the computer is negative, then the frequency of the pulses applied to the stepper motor 98 by the circuit 100 is less than the frequency of the oscillator 90, so thaat the wheel 10 is driven more slowly (or through a smaller angle) than the wheel 8.

Figure 8:
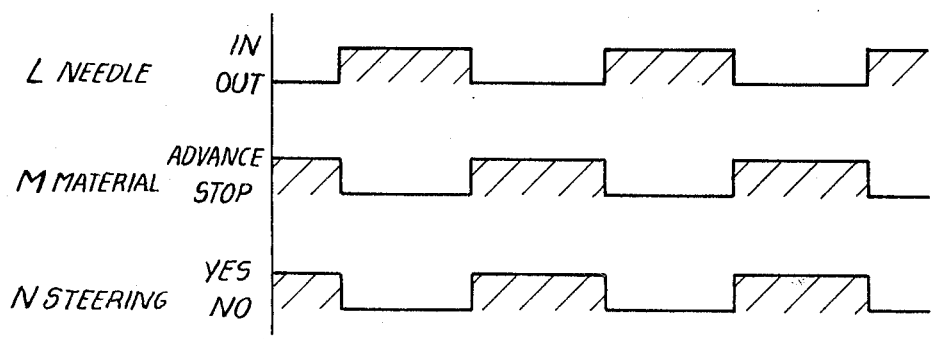
FIG. 8 is a timing diagram to assist understanding of the embodiment of FIG. 7.

As indicated, the wheels 8 and 10 are driven during those intervals when the needle is out of the material. The timing diagram of FIG. 8 will assist in understanding this. As shown, the waveform L indicates when the needle is in or out of the material, and the waveform M indicates the periods when the material is advanced and is stationary. As can be seen, the needle is only in the material when the material is stationary, and the material is advanced only when the needle is out. Further, the waveform N indicates when steering of the workpiece takes place. As seen, the steering takes place simultaneously with the advance of the workpiece. The diagram of FIG. 8 also applies to the embodiment of FIG. 6.

Accordingly, in the embodiment shown in FIGS. 6 and 7, even though intermittent drive is employed, accurate steering of the workpiece around the centre of curvature of the edge is achieved.

An alternative form of automatic guidance apparatus in accordance with the invention is shown in FIGS. 9 and 10 of the accompanying drawings. In this embodiment, as in the previous embodiments, the object is to form a stitch line 18 parallel to the edge 16a of the leather 16. However, the means for achieving this is somewhat different to that of the previous embodiment.

In FIGS. 9 and 10, a stop 140 adjustable in the direction of the arrow 142 is mounted on the bed 6 of the sewing machine. The position to which the stop is adjusted determines the distance between the edge 16a of the material 16 and the stitch line 18, this distance being equal to the distance between the needle postion 20 and a front edge portion 140a of the stop 140.

A primary drive wheel 144 is provided in the sewing machine bed and is operative to drive the material 16 in the direction of the arrow 146, which is the normal direction of feed of the material through the machine. A secondary drive wheel 148 is also provided in the bed of the machine and this drives the material 16 in the direction of the arrow 150. The means for driving the wheels 144 and 148 is arranged such that the resultant force on the material 16 is in the direction of the arrow 152, that is to say the material is urged against the portion 140a of the stop 140, but the direction of the resultant force indicated by the arrow 152 is such that there is no tendency to rotate the material.

Rotation of the material 16 is effected by means of a guide wheel 154 which can be driven in either direction as indicated by the arrow 156. The drive to the wheel 154 is by a motor 154a controlled by a probe 158 such that if the probe is displaced to the right due to the edge 16a of the material 16 curving to the right (as seen in FIG. 10 for example) the wheel 154 is driven in a direction to swing the material 16 in a clockwise direction so that the probe 158 moves back to its central position which is as shown in the drawings. Should the curvature of the edge 16a be in the opposite direction, then the probe would move in the opposite direction and this would cause the wheel 154 to be driven to rotate the material 16 anti-clockwise to recentralise the probe 158. The central position of the probe 158 is such that its edge 158a which is in contact with the edge 16a of the material 16 and the edge 140a of the stop 140 are both on a common line parallel to the direction 146 along which the material is fed through the machine.

It will be noted that since the material has to move in the direction of the arrow A, which is at right angles to the direction in which the wheels 148 and 154 act on the material, the wheels 148 and 154 have their edges formed in such a way that the material may move freely in the direction of the arrow 146 without interference, so far as possible, from the wheels 148 and 154. To permit the rotation of the material to take place, the wheel 144 has its periphery similarly formed. It may be noted that the wheels 144 and 148 are located in the bed 6 of the machine 2, whereas the guide wheel 154 is located above the material and accordingly, although this is not shown in the drawings, the wheel 154 and its drive 154a are supported by the head 4 of the machine 2, as is the probe 158.

A variety of modifications are possible within the scope of the invention. For example, although in the embodiments of FIGS. 1 to 8 the drive has been shown only from below the material 16, and in the embodiment of FIGS. 9 and 10 the drive wheels 144 and 148 are located below the material whereas the guide wheel 154 is located above the material, in either embodiment drive could be from above and/or from below the material in the case of any of the drive or guide wheels. In the case where an upper and a lower drive wheel is provided these wheels may be driven in synchronism. These arrangements may be particularly advantageous where two pieces of material are being stitched together, for example where the lining of the shoe is being stitched to an upper component of the shoe. Alternatively, the upper and lower guide and drive wheels may be driven independently of each other for example where two pieces of material are to be guided along different paths relative to the machine.

In the case of the embodiments of FIGS. 1 to 8, the secondary drive wheel 10 could be arranged at a right angle, or some other angle to the main drive wheel 8. The computer could then be modified to ensure that the correct relative drive speeds are imparted to the wheels to effect steering about the centre of curvature of the curve to be followed.

Although a mechanical probe has been shown in each of the embodiments, any alternative sensing means may be used. For example optical sensing means including, for example, a light source or sources and a photoelectric cell or cells could be utilised to produce the required signal by sensing the edge of the material; or pneumatic sensing.

If desired, where it is proposed to form stitch lines or carry out other operations in patterns other than a line following the edge of a piece of material, markings for example magnetic or optical markings may be made on the material to which a sensor can respond, and the system arranged so that the workpiece can be caused to follow the markings or a path parallel thereto. A device for sensing a magnetic line may comprise first and second electromagnetic transducers to be disposed at opposite sides of the line such that if the line curves one way the signal provided by one transducer will increase in magnitude whereas the signal provided by the other transducer will decrease in magnitude, and vice versa if the line curves in the opposite direction, thus enabling production of a positive or negative voltage representative of the direction and sharpness of the curve.

Also, instead of a probe, the guide means could be controlled by pre-recorded information for example on magnetic tape, paper tape or punched cards, which information would be effectively a recording of the required pattern to be stitched. The means for reading the tape or cards would then constitute means for providing a signal representative of the curvature of the path to be followed. This modification could be simply achieved in the embodiment of FIGS. 1 to 8 by supplying a voltage, varying in dependence upon the required pattern, to the computer 36 in place of the signal from the probe, which voltage may also be applied to the speed controller 38. This may be particularly useful for producing decorative features on an article such as a shoe.

As examples of specific modifications which might be made to the embodiment of FIGS. 1 to 6, the servo motor could drive the wheel 10 directly instead of through a differential gearbox but it is considered that a better response can be produced by means of a differential gearbox. Also, in addition to the two drive wheels 8 and 10 of FIGS. 1 to 3, a cross-drive, similar to the drive wheel 148 and a stop, similar to the stop 140, could be provided in the embodiment of FIGS. 1 to 8.

Further, in the embodiment of FIGS. 9 and 10 the guide wheel 56 could be replaced by an arrangement for effecting rotation of the material similar to the wheels 8 and 10 of FIGS. 1 to 3 with or without the computer and associated circuitry and mechanisms, according to the degree of accuracy required.

Although the invention has been described with particular reference to sewing machines, the invention has utility for guiding workpieces through other types of machine, especially machines in which a particular operation is to be carried out along a required line. One example of such an alternative machine is a folding machine which operates to fold over the edge of a piece of shoe upper material for use as an upper component such as a strap or the quarter. Further examples of such alternative machines are binding machines, beading machines, skiving machines, roughing machines, and staining machines. The guidance and driving system may provide intermittent or continuous drive according to which is better having regard to the particular type of machine in which the system is to be embodied.

The circuits 36 shown in FIG. 4 have been described as carrying out the computation.

$$\frac{2dq\ v_2}{p^2 + 2aq + q^2}$$

The circuits are preferably analogue but they could be digital or a combination of analogue and digital circuits. For example, the probe and tachometer 22 and 24 respectively may produce analogue signals which are converted to digital form for processing in the circuits 26 and the digital signals produced by the circuit 26 may be reconverted to analogue form for feeding to the amplifier 28 and servo motor 12. Also, although a relatively complex equation (i.e., equation V) has been used to illustrate the operation of the embodiment of FIGS. 1 to 8, the equation may in some circumstances be simplified such as by ignoring the term $q^2$ when $q$ is likely to be small, so as to achieve economy in the design and manufacture of the circuits 26 or other signal conditioning means.

If desired, in the embodiment of FIGS. 1 to 8, the speed of the wheel 8 could be varied instead of that of the wheel 10. The required speed differential to be applied to the wheel 8 would then be $v_2 - v_1$, instead of $v_1 - v_2$, and this can be computed by the circuitry shown in FIG. 4 but with the addition of means to change the sign of the output.

The invention may reside in many different aspects of the apparatus which has been illustrated in the drawings. For example, in one aspect the invention may reside in either of the alternative means shown for causing the material to rotate so that the operation being performed is caused to be performed along the predetermined line. Alternatively, the invention may reside in the means whereby the mechanism for effecting this rotation is controlled. Such control means may include the probes which have been illustrated and the various parts associated therewith.

Although only wheels have been illustrated in the drawings as drive members, other types of drive members could be employed, such as orbiting dogs (providing intermittent drive), rollers or belts.

In describing the embodiments shown in the drawings it has been assumed that the various signals produced are electrical. Alternatively, other means could be used such as hydraulic, mechanical, pneumatic and fluidic signalling means.

It may be noted that where a large workpiece is being fed, off-center forces due to the drag of the workpiece may be sufficiently large to cause rotation of the workpiece even when the wheels 8 and 10 of FIGS. 1 to 8 are rotated at equal speed or where the wheel 154 of FIGS. 9 and 10 is stationary. The servo systems illustrated will compensate for this, and thus straight line feeding of the workpiece may in circumstances where this workpiece drag is sufficiently large require the wheels 8 and 10 to be rotated at different velocities or the wheel 154 to be rotated in one direction or the other. Accordingly, references herein to velocities of the drive means effective for straight line feeding are to be understood in this context.

Also, although the needle axis has been shown to intercept the axis 11 of the drive wheels 8, 10 and of the drive wheel 144, this is not essential but is preferable.

What we claim is:

1. Apparatus for guiding a workpiece through a machine to present to a work station successive portions of the workpiece located along a curved path, comprising drive means for imparting motion to the workpiece to advance said portions of said workpiece through said work station in a substantially constant direction, means for providing a signal dependent upon the radius of curvature of said curved path to be followed by the workpiece, and control means responsive to said signal for controlling said drive means to cause the workpiece to rotate the workpiece so as to steer the workpiece substantially about the center of curvature of said curved path.

2. Apparatus according to claim 1, wherein said drive means comprises first and second drive members adapted to engage the workpiece at spaced positions, and said control means is operative to cause said first and second drive members to be driven at speeds appropriate for effecting said steering about substantially said centre of curvature.

3. Apparatus according to claim 1, wherein said signal providing means comprises a sensor operable to sense a predetermined line on the workpiece and to generate said signal such as to cause said control means to drive said drive means such that said predetermined line is followed.

4. Apparatus according to claim 1, wherein said drive means comprises at least one drive member disposed immediately adjacent said work station and arranged to frictionally engage said workpiece to impart motion thereto.

5. Apparatus for guiding a workpiece through a machine, comprising drive means for imparting motion to the workpiece, means for providing a signal dependent upon the radius of curvature of a curved path to be followed by the workpiece, control means responsive to said signal for controlling said drive means to cause the workpiece to be steered substantially about the center of curvature of said curved path, said drive means comprising first and second drive members adapted to engage the workpiece at spaced positions, said control means being operative to cause said first and second drive means to be driven at speeds appropriate for effecting said steering about substantially said center of curvature, said drive members are operative to impart motion to said workpiece in parallel directions.

6. Apparatus according to claim 5, wherein said drive means comprises common means operable for driving said drive members at speeds for effecting feeding of the workpiece along a substantially straight line and means interposed between said common drive means and at least one of said drive members for superimposing an additional positive or negative speed on said at least one member in response to said signal produced by said control means to effect said steering.

7. Apparatus according to claim 6, wherein said common means comprises a motor, and said interposed means comprises a transmission device.

8. Apparatus according to claim 7, wherein said transmission device comprises a differential gear mechanism having first and second inputs, a first of said inputs being connected to said motor to be driven thereby; and including a servo motor responsive to the signal produced by said control means for rotation in opposite directions, said servo motor being connected to the second said input of said differential gear mechanism, said differential gear mechanism having an output connected to said at least one drive member.

9. Apparatus according to claim 6, including first and second electric motors for driving said respective drive members, and wherein said common means comprises a power supply circuit for supplying electric power to said motors.

10. Apparatus according to claim 9, wherein said interposed means is between said power supply circuit and a said motor.

11. Apparatus according to claim 10, wherein said motors are stepper motors, said power supply circuit comprises an oscillator for producing pulses for supply to said stepper motors, and said interposed means comprises frequency shifting means responsive to the signal produced by said control means.

12. Apparatus according to claim 6, wherein said common means is operable at a variable speed for varying the speed at which the workpiece is fed through the machine.

13. Apparatus according to claim 12, including means for automatically varying the speed of said common means in dependence upon the magnitude of the signal provided by said signal generating means.

14. Apparatus according to claim 13, including a variable speed operating mechanism of said machine, said common means also providing drive to said operating mechanism.

15. Apparatus according to claim 6, wherein said common means is operable to drive said members intermittently and simultaneously.

16. Apparatus according to claim 15, wherein said control means receives a signal from said common means such that, in the periods between which intermittent drive is applied to said drive members, the speed to be superimposed on said at least one drive member is zero.

17. Apparatus according to claim 5, wherein said signal providing means comprises a sensor operable to sense a predetermined line on the workpiece and to generate said signal such as to cause said control means to drive said drive members such that said predetermined line is followed.

18. Apparatus according to claim 5, wherein said control means includes computing means, means to supply said signal to said computing means, and means to supply to said computing means a further signal representative of the speed of feeding the workpiece through the machine, said computing means being operable to effect a computation on said signals and to produce an output signal which is representative of the required angular velocity to be imparted to the workpiece to effect said steering correctly, and means for supplying said output signal to said drive means.

19. Apparatus according to claim 18, wherein said drive members are operable to impart motion to said workpiece in parallel directions, and wherein said output signal thereby represents the required speed difference to be imparted to said drive members.

20. Apparatus according to claim 19, wherein said drive members are disposed on a common line upon which the centres of curvature about which the workpiece can be steered are also located.

21. Apparatus according to claim 20, wherein said signal providing means comprises a sensor to sense a physical line on said workpiece, said sensor being located in advance of said common line and being adapted to produce a signal representative of the magnitude and direction of deviation of said physical line from a straight line normal to said common line and intersecting the point of intersection of said common line and said physical line, and said computing means being operative to compute the equation:

$$v_1 - v_2 = \frac{2dq\, v_2}{p^2 + 2aq + a^2}$$

where:

$d$ is the distance (measured along said common line) between the drive members, $q$ is the deviation sensed by the sensor, $v_2$ is the speed at which one of said drive members is driven and represents said speed of feeding of feeding of the workpiece, $v_1$ is the speed at which the other said drive member is to be driven to effect said steering, $p$ is the spacing between the intersection of said common line and said physical and the drive member nearer thereto, $a$ is the distance from said sensor to said common line.

22. Apparatus according to claim 21, wherein said control means is operable to compute an approximation of said equation.

23. Apparatus according to claim 22, wherein said approximation comprises ignoring $q^2$.

24. Apparatus according to claim 20, wherein said machine includes a work station disposed on said common line.

25. Apparatus for guiding a workpiece through a machine to present to a work station successive portions of said workpiece located along a curved path, comprising drive means operable for advancing said workpiece intermittently through the machine such that said successive portions of said workpiece move through said work station in a substantially constant direction, and control means for rotating said workpiece simultaneously with said intermittent advances thereof to effect steering of the workpiece along said path during said intermittent advances of said portions of said workpiece in said substantially constant direction.

26. Apparatus according to claim 25, wherein said signal providing means comprises a sensor operable to sense a predetermined line on the workpiece and to generate said signal such as to cause said control means to drive said drive means such that said predetermined line is followed.

27. Apparatus according to claim 25, wherein said drive means comprises at least one drive member disposed immediately adjacent said work station and arranged to frictionally engage said workpiece to impart motion thereto.

28. Apparatus for guiding a workpiece through a machine to present to a work station successive portions of said workpiece located along a curved path, comprising a plurality of drive members engageable with the workpiece at spaced apart positions for imparting motion thereto, common means for driving said drive members at speeds for effecting feeding of the workpiece substantially in a straight line of constant direction, and means for superimposing additional speed on at least one of said drive members to cause the workpiece to rotate for effecting steering of the workpiece.

29. Apparatus according to claim 28, wherein said signal providing means comprises a sensor operable to sense a predetermined line on the workpiece and to generate said signal such as to cause said control means to drive said drive means such that said predetermined line is followed.

30. Apparatus according to claim 28, wherein said drive members are disposed closely adjacent said work station.

* * * * *

UNITED STATES PATENT OFFICE
CERTIFICATE OF CORRECTION

Patent No. 3,925,713      Dated December 9, 1975

Inventor(s) Richard Malcolm Richmond

It is certified that error appears in the above-identified patent and that said Letters Patent are hereby corrected as shown below:

Column 9, line 22, the number "154" should read -- 156 --.

Signed and Sealed this ninth Day of March 1976

[SEAL]

Attest:

RUTH C. MASON  
*Attesting Officer*

C. MARSHALL DANN  
*Commissioner of Patents and Trademarks*